(12) United States Patent
Ryu et al.

(10) Patent No.: US 9,874,154 B2
(45) Date of Patent: Jan. 23, 2018

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/258,148

(22) Filed: Sep. 7, 2016

(65) Prior Publication Data

US 2017/0167405 A1     Jun. 15, 2017

(30) Foreign Application Priority Data

Dec. 11, 2015 (KR) .......................... 10-2015-0176937

(51) Int. Cl.
| | | |
|---|---|---|
| F02D 13/04 | (2006.01) | |
| F02D 13/02 | (2006.01) | |
| F01L 13/00 | (2006.01) | |

(52) U.S. Cl.
CPC ...... F02D 13/0215 (2013.01); F01L 13/0015 (2013.01); F02D 13/0226 (2013.01);
(Continued)

(58) Field of Classification Search
CPC ............. F02D 13/0207; F02D 13/0242; F02D 13/0246; F02D 2041/001; F02D 9/04; F02D 13/0226; F02D 13/0257; F02D 13/0261; F02D 13/0284; F02D 13/023; F01L 13/065; F01L 13/0015
(Continued)

(56) References Cited

U.S. PATENT DOCUMENTS

| | | | |
|---|---|---|---|
| 2017/0167318 A1* | 6/2017 | Ryu | ..................... F01L 13/0015 |
| 2017/0167393 A1* | 6/2017 | Ryu | ........................ F02D 41/26 |

(Continued)

FOREIGN PATENT DOCUMENTS

| | | | |
|---|---|---|---|
| JP | 2006-118381 A | 5/2006 | |
| JP | 2008-151059 A | 7/2008 | |

(Continued)

*Primary Examiner* — John Kwon
(74) *Attorney, Agent, or Firm* — Brinks Gilson & Lione

(57) ABSTRACT

A method for controlling valve timing of an engine includes: classifying control regions depending on an engine speed and an engine load, and applying a maximum duration to an intake valve and controlling a valve overlap in the first control region; advancing an intake valve closing (IVC) timing and applying the maximum duration to the exhaust valve in the second control region; advancing both the IVC timing and an exhaust valve closing (EVC) timing in the third control region; fixing an exhaust valve opening (EVO) timing and approaching the EVC timing to a top dead center (TDC) in the fourth control region; controlling a wide open throttle valve (WOT) and retarding the EVO timing in the fifth control region; and controlling the WOT, advancing the EVO timing, and approaching the EVC timing to the TDC in the sixth control region.

10 Claims, 4 Drawing Sheets

(52) U.S. Cl.
CPC ..... F02D 13/0261 (2013.01); *F01L 2013/111* (2013.01); *F02D 2200/101* (2013.01); *F02D 2200/1002* (2013.01)

(58) Field of Classification Search
USPC .................................. 123/321–323, 345–348
See application file for complete search history.

(56) References Cited

U.S. PATENT DOCUMENTS

| | | | |
|---|---|---|---|
| 2017/0167394 A1* | 6/2017 | Ryu | .................... F02D 13/0215 |
| 2017/0167396 A1* | 6/2017 | Ryu | .................... F02D 41/0002 |
| 2017/0167399 A1* | 6/2017 | Ryu | .................... F02D 13/0215 |
| 2017/0167401 A1* | 6/2017 | Ryu | ........................ F01L 1/34 |
| 2017/0167402 A1* | 6/2017 | Ryu | .................... B60W 20/10 |
| 2017/0167403 A1* | 6/2017 | Ryu | .................... B60W 10/06 |
| 2017/0167404 A1* | 6/2017 | Ryu | .................... F02D 13/0215 |
| 2017/0167405 A1* | 6/2017 | Ryu | .................... F01L 13/0015 |
| 2017/0167406 A1* | 6/2017 | Ryu | ........................ F01L 1/34 |
| 2017/0234243 A1* | 8/2017 | Ryu | .................... F02D 13/0207 |
| | | | 123/350 |

FOREIGN PATENT DOCUMENTS

| | | |
|---|---|---|
| JP | 2008-274963 A | 11/2008 |
| JP | 2010-216464 A | 9/2010 |

\* cited by examiner

IVD map
(Unit : Crank angle)

IVO timing map
(Unit : Before TDC)

IVC timing map
(Unit : After BDC)

EVD map
(Unit : Crank angle)

EVO timing map
(Unit : Before BDC)

EVC timing map
(Unit : After TDC)

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176937, filed on Dec. 11, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve. In addition, the CVVT device may advance or retard the opening or closing timing of the valve in a state that the opening duration of the valve is fixed. That is, if the opening timing of the valve is determined, the closing timing is automatically determined according to the opening duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine that simultaneously controls duration and timing of the valve being equipped with a continuous variable valve timing device disposed on an intake valve side, and being equipped with a continuous variable valve duration device and continuous variable valve timing device disposed on an exhaust valve side.

A method for controlling valve timing provided with a continuous variable valve timing (CVVT) device at an intake valve side and a continuous variable valve duration (CVVD) and a continuous variable valve timing (CVVT) devices at an exhaust valve side may include classifying a plurality of control regions depending on an engine speed and an engine load. In particular, the a plurality of control regions comprises: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth control region when the engine load is greater than or equal to the second predetermined load and the engine speed is greater than or equal to a first predetermined speed and less than a second predetermined speed; a fifth control region when the engine load is greater than or equal to the third predetermined load and the engine speed is less than the first predetermined speed; and a sixth control region when the engine load is greater than or equal to the third predetermined load and the engine speed is greater than or equal to the second predetermined speed.

The method for controlling valve timing further includes: applying a maximum duration to an intake valve and controlling a valve overlap by using the exhaust valve in the first control region; advancing an intake valve closing (IVC) timing and applying the maximum duration to the exhaust valve in the second control region; advancing both the intake valve closing (IVC) timing and an exhaust valve closing (EVC) timing in the third control region; fixing an exhaust valve opening (EVO) timing and approaching the exhaust valve closing (EVC) timing to a top dead center (TDC) in the fourth control region; controlling a wide open throttle valve (WOT) and retarding the exhaust valve opening (EVO) timing in the fifth control region; and controlling a wide open throttle valve (WOT), advancing the exhaust valve opening (EVO) timing, and approaching the exhaust valve closing (EVC) timing to the top dead center (TDC) in the sixth control region.

If the control region is in the first control region, then the controller may control both the IVC timing and the EVO timing to be fixed and controls the EVC timing to be set up at a maximum value within sustainable combust stability.

If the control region is in the second control region, then the controller may fix the EVO timing and controls the EVC timing to be set at which a control overlap is maximized so as to apply the maximum duration to the exhaust valve.

If the control region is in the third control region, then the controller may advance the intake valve closing (IVC) timing to be close to a bottom dead center when the engine speed is less than a predetermined speed, the controller may advance the intake valve close (IVC) timing to after the bottom dead center when the engine speed is greater than or equal to the predetermined speed.

If the control region is in the fifth control region, then the controller may advance the intake valve opening (IVO) timing to before a top dead center to generate the scavenging and may control the exhaust valve close (EVC) timing to after a top dead center such that a catalyst temperature is maintained within predetermined temperature.

A system for controlling valve timing of a continuous variable valve duration engine provided with a turbo charger may include: a data detector detecting data related to a running state of the vehicle; a camshaft position sensor detecting a position of a camshaft; an intake continuous variable valve duration (CVVD) device controlling an opening time of an intake valve of the engine; an exhaust continuous variable valve duration (CVVD) device controlling an opening time of an exhaust valve of the engine; an exhaust continuous variable valve timing (CVVT) device controlling an opening and closing timing of the exhaust valve of the engine; and a controller configured to classify the running state of the vehicle into a plurality of control regions depending on an engine speed and an engine load based on signals from the data detector and camshaft position sensor. The controller further controls the intake CVVD device, the exhaust CVVD device, and the exhaust CVVT device according to the control regions.

In particular, the a plurality of control regions may include: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth region when the engine load is greater than or equal to the second predetermined load and the engine speed is greater than or equal to a first predetermined speed and less than a second predetermined speed; a fifth region when the engine load is greater than or equal to the third predetermined load and the engine speed is less than the first predetermined speed; and a sixth region when the engine load is greater than or equal to the third predetermined load and the engine speed is greater than or equal to the second predetermined speed. The controller may apply a maximum duration to the intake valve and control a valve overlap by using the exhaust valve in the first control region, advance an intake valve close (IVC) timing and applies the maximum duration to the exhaust valve in the second control region, advance the intake valve close (IVC) timing and an exhaust valve close (EVC) timing in the third control region, fix an exhaust valve opening (EVO) timing and approach the exhaust valve close (EVC) timing to a top dead center in the fourth control region, control a wide open throttle valve (WOT) and retard the exhaust valve opening (EVO) timing in the fifth control region, control a wide open throttle valve (WOT), advance the exhaust valve opening (EVO) timing, and approach the exhaust valve closing (EVC) timing to the top dead center in the sixth control region.

The controller may control both the IVC timing and the EVO timing to be fixed and controls the EVC timing to be set up at a maximum value within sustainable combust stability in the first control region.

The controller may fix the EVO timing and controls the EVC timing to be set at which a control overlap is maximized so as to apply the maximum duration to the exhaust valve in the second control region.

The controller may advance the intake valve close (IVC) timing to be close to a bottom dead center when the engine speed is less than a predetermined speed, the controller advances the intake valve close (IVC) timing to after the bottom dead center when the engine speed is greater than or equal to the predetermined speed in the third control region.

The controller may advance the intake valve opening (IVO) timing to before a top dead center to generate the scavenging and controls the exhaust valve close (EVC) timing to after a top dead center such that a catalyst temperature is maintained within predetermined temperature in the fifth control region.

As described above, according to one form of the present disclosure, duration and timing of the continuous variable valve are simultaneously controlled, so the engine may be controlled under desirable conditions.

That is, since opening timing and closing timing of the intake valve and the exhaust valve are appropriately controlled, and thus fuel efficiency under a partial load condition and engine performance under a high load condition are improved. In addition, a starting fuel amount may be reduced by increasing a valid compression ratio, and exhaust gas may be reduced by shortening time for heating a catalyst.

Moreover, even if the continuous variable valve duration device is skipped, the power performance may be maintained with low cost through fixed cam in the intake valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
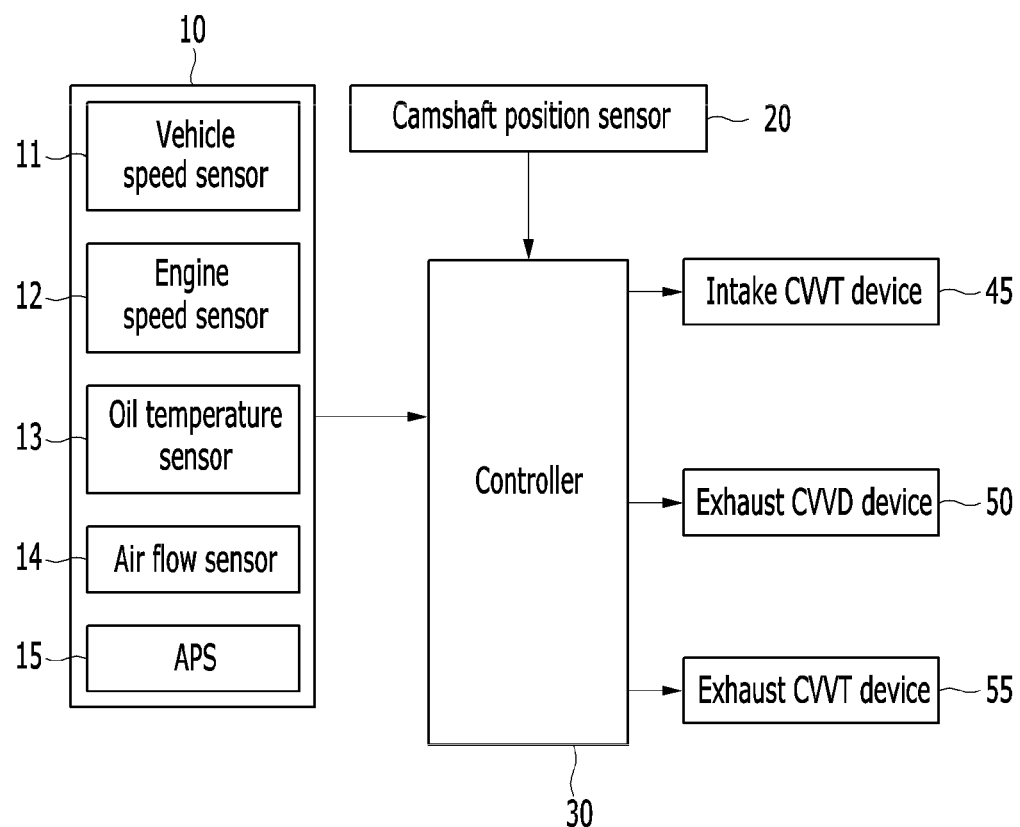
FIG. 1 is a schematic block diagram showing a system for controlling valve timing of a continuous variable valve duration engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

As shown in FIG. 1, a system for controlling valve timing of a continuous variable valve duration engine includes: a data detector 10, a camshaft position sensor 20, a controller 30, an intake continuous variable valve timing (CVVT) device 45, an exhaust continuous variable valve duration (CVVD) device 50, and an exhaust continuous variable valve timing (CVVT) device 55.

The data detector 10 detects data related to a running state of the vehicle for controlling the intake continuous variable valve timing (CVVT) device 45, the exhaust continuous variable valve duration (CVVD) device 50, and the exhaust continuous variable valve timing (CVVT) device 55. The data detector 10 includes a vehicle speed sensor 11, an engine speed sensor 12, an oil temperature sensor 13, an air flow sensor 14, and an accelerator pedal position sensor 15, although other sensors may be employed.

The vehicle speed sensor 11 detects a vehicle speed, transmits a corresponding signal to the controller 30, and may be mounted at a wheel of the vehicle.

The engine speed sensor 12 detects a rotation speed of the engine from a change in phase of a crankshaft or camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be determined by measuring a coolant temperature using a coolant temperature sensor mounted at a coolant passage of an intake manifold. Therefore, in one form, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor (APS) 15 detects a degree in which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in one form, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
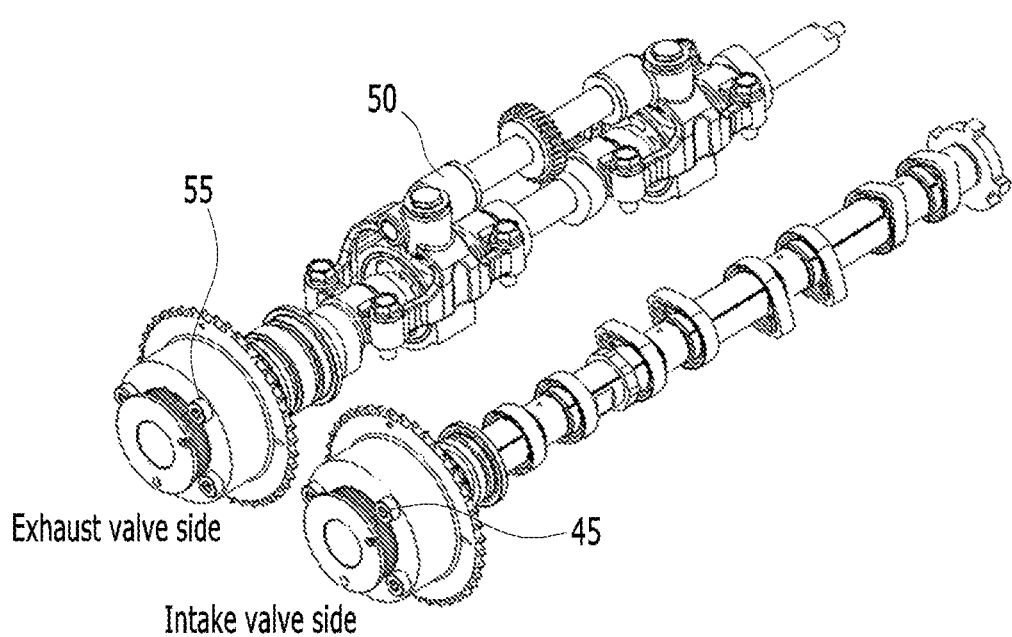
FIG. 2 is a perspective view showing a continuous variable valve timing device which is disposed on an intake valve side, and a continuous variable valve duration device and continuous variable valve timing device which is disposed on an exhaust valve side.

FIG. 2 is a perspective view showing a continuous variable valve timing device which is disposed on intake valve side, and a continuous variable valve duration device and continuous variable valve timing device which is disposed on exhaust valve side.

As shown in FIG. 2, only the continuously variable valve timing device is assembled to the intake valve through a fixed cam, whereas the continuous variable valve duration device and the continuous variable valve timing are provided to the exhaust valve. Accordingly, duration of the intake valve (IVD) is fixed according to the present disclosure. The fuel efficiency and a high-speed performance may be improved as the intake valve duration (IVD) is longer, however a low-speed performance may be deteriorated. Thereby, a continuous variable valve timing (CVVD) may be fixed at an angle of approximately 250-260 degrees an operation angle thereof.

The intake continuous variable valve timing (CVVT) device 45 controls opening and closing timing of the intake valve of the engine according to a signal from the controller 30, and the exhaust continuous variable valve timing (CVVT) device 55 controls opening and closing timing of the exhaust valve of the engine according to a signal from the controller 30.

The exhaust continuous variable valve duration (CVVD) device 50 controls an opening time (i.e., opening duration) of an exhaust valve of the engine according to a signal from the controller 30.

The controller 30 may classify a plurality of control regions depending on an engine speed and an engine load based on signals from the data detector 10 and camshaft position sensor 20, and the controller 30 controls the intake CVVT devices 45, and the exhaust CVVD and CVVT devices 50 and 55 according to the control regions. Herein, the plurality of control regions may be classified into six regions.

The controller 30 applies a maximum duration to the intake valve and limits a valve overlap by using the exhaust valve in a first control region, and the controller 30 advances an intake valve closing (IVC) timing and applies the maximum duration to the exhaust valve in the second control region, advances the intake valve closing (IVC) timing and an exhaust valve closing (EVC) timing in the third control region, fixes an exhaust valve opening (EVO) timing and approaches the exhaust valve closing (EVC) timing to a top dead center in the fourth control region, controls a wide open throttle valve (WOT) and retards the exhaust valve opening (EVO) timing in the fifth control region, controls a wide open throttle valve (WOT), advances the exhaust valve opening (EVO) timing, and approaches the exhaust valve closing (EVC) timing to the top dead center in the sixth control region.

For these purposes, the controller 30 may be implemented as at least one processor that is operated by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
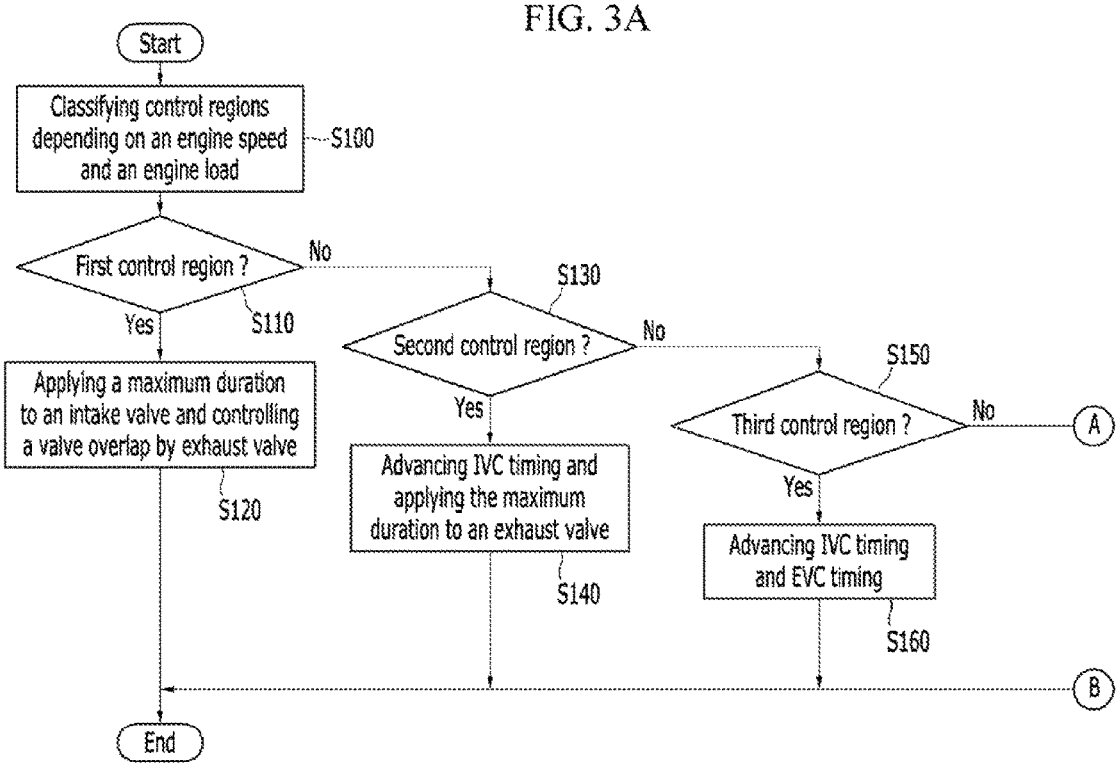
FIG. 3A and FIG. 3B are flowchart showing a method for controlling valve timing of a continuous variable valve duration engine.
Figure 3B:
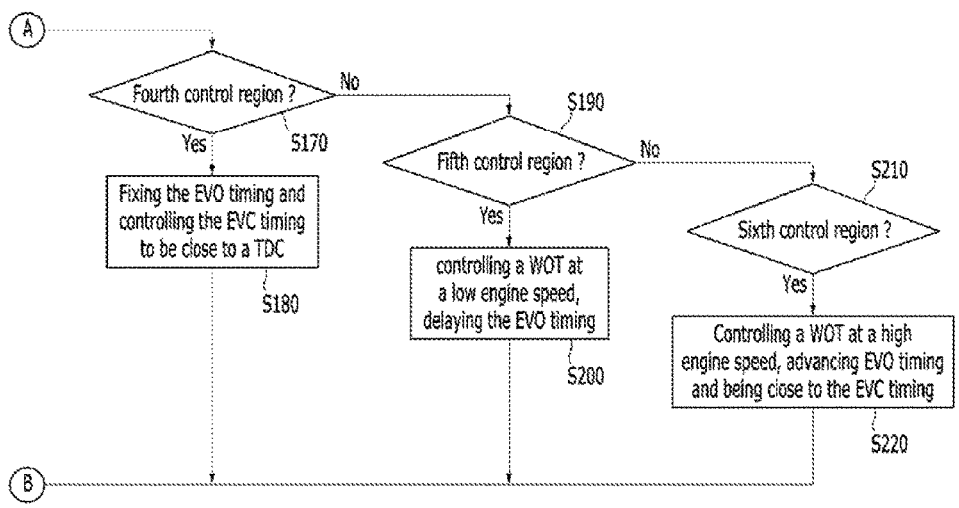

FIG. 3A and FIG. 3B are flowcharts showing a method for controlling valve timing of a continuous variable valve duration engine.

Figure 4A:
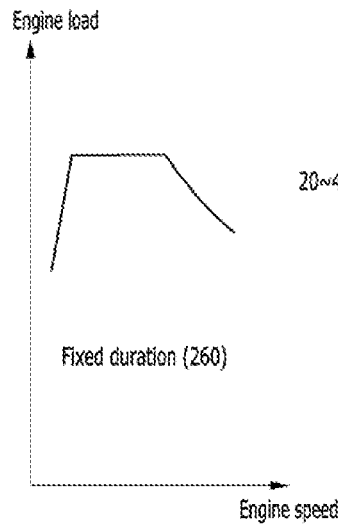
FIGS. 4A-4C are graphs showing duration, opening timing, and closing timing of an intake valve depending on an engine load and an engine speed.
Figure 4B:
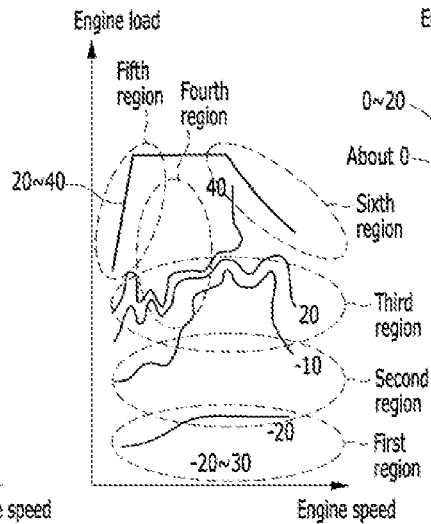
Figure 4C:
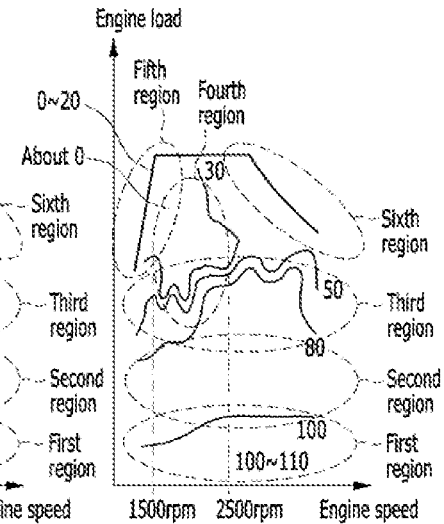
Figure 5A:
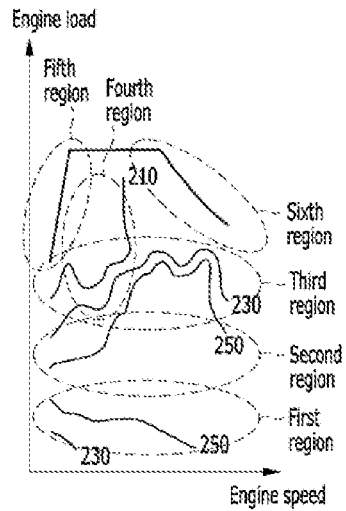
FIGS. 5A-5C are graphs showing duration, opening timing, and closing timing of an exhaust valve depending on an engine load and an engine speed.
Figure 5B:
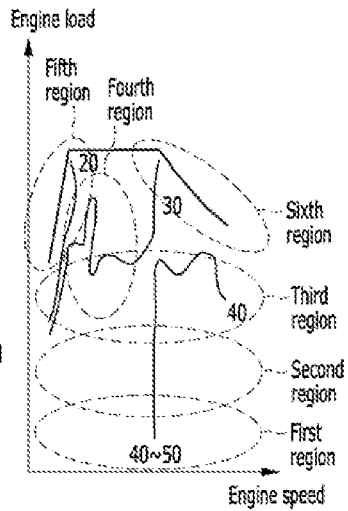
Figure 5C:
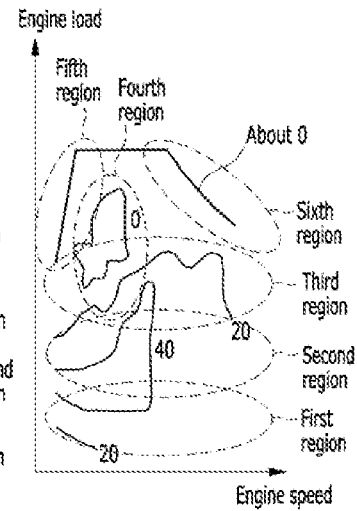

FIGS. 4A-4C are graphs showing duration, opening timing, and closing timing of an intake valve depending on an engine load and an engine speed, and FIGS. 5A-5C are graphs showing duration, opening timing, and closing timing of an exhaust valve depending on an engine load and an engine speed.

As shown in FIG. 3A and FIG. 3B, a method for controlling valve timing of a continuous variable valve duration engine starts with classifying a plurality of control regions depending on an engine speed and an engine load by the controller 30 at step S100.

The control regions will be described with reference to FIG. 4A to FIG. 5C. The first to sixth control regions are indicated in the FIG. 4A to FIG. 5C.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth region when the engine load is greater than or equal to the second predetermined load and the engine speed is greater than or equal to a first predetermined speed and less than a second predetermined speed, a fifth region when the engine load is greater than or equal to the third predetermined load and the engine speed is less than the first predetermined speed, and a sixth region when the engine load is greater than or equal to the third predetermined load and the engine speed is greater than or equal to the second predetermined speed.

Meanwhile, referring the FIG. 4A to FIG. 5C, a crank angle is marked in an intake valve duration (IVD) map and an exhaust valve duration (EVD) map, which indicating the opening time of the intake valve and exhaust valve. For example, regarding the EVD map in the FIG. 5A, a curved line written as a number 210 in the fourth control region means that the crank angle is approximately 210 degree. Although not shown in the drawing, the crank angle which is more than approximately 210 degrees and less than approximately 230 degree is positioned between the curved line of the number 210 and the curved line of the number 230.

In addition, a unit of number designated in an intake valve opening (IVO) timing map is before a top dead center (TDC), a unit of number designated in an intake valve closing (IVC) timing map is after a bottom dead center (BDC), a unit of number designated in an exhaust valve opening (EVO) timing map is before BDC, and a unit of number designated in an exhaust valve closing (EVC) map is after TDC.

Each region and curved line in the FIG. 4A to FIG. 5C are the exemplary form of the present disclosure, it may be modified within the technical idea and scope of the present disclosure.

The control regions are classified according to the engine speed and load in the step of S100. After that, the controller 30 determines whether the engine state is under the first control region at step S110.

In the step of S110, if the engine load is less than a first predetermined load, the controller 30 determines that the engine state is under the first control region. At this time, the controller 30 applies a maximum duration to the intake valve and controls the valve overlap between the exhaust valve and intake valve at step S120. The valve overlap is in a state where the intake valve is opened and the exhaust valve is not closed yet.

In other words, when the engine is under low load, then the controller 30 may control the intake valve closing (IVC) timing being fixed such that the intake valve has a maximum duration value in the first control region. As shown in FIGS. 4A-4C, the intake valve closing (IVC) timing may be an angle of approximately 100-110 degrees after a bottom dead center. And the intake valve opening (IVO) timing may be controlled at an angle of approximately 20-30 degrees after the top dead center and determined by the intake valve closing (IVC) timing due to fixed duration of the intake valve.

Also, the controller 30 may control the EVO timing to be fixed and set up the EVC timing. Meanwhile, as the valve overlap is increased, the fuel consumption is cut, whereas the combust stability is deteriorated. Accordingly, properly setting the valve overlap is desired. However, in another form, it is possible to get highly improved fuel-efficiency by setting a desirable valve overlap up, which fixing the EVO timing and controlling the EVC timing to be set up at a maximum value within sustainable combust stability. The timing value may be determined by a predetermined map.

For example, as shown in FIGS. 5A-5C, the EVO timing may be fixed at approximately 40 to 50 degrees before BDC, the EVC timing may be established by moving the degrees thereof in an after TDC direction. The EVC timing may be a maximum value such that the combust stability is sustainable.

When the current engine state does not belong to the first control region at the step S110, the controller 30 determines whether the current engine state belongs to the second control region at step S130.

In the step of S130, if the engine load is more than or equal to the first predetermined load and less than the second predetermined load, the controller 30 determines that the engine state is under the second control region. At this time, controller 30 advances the intake valve closing (IVC) timing and applies a maximum duration to the exhaust valve at step S140.

The IVC timing is controlled at a LIVC position (Late Intake Valve Closing; an angle of approximately 100-110 degrees after BDC, referring to the FIGS. 4A-4C) because the maximum duration is applied to the intake valve in the first control region. When the IVC timing is positioned at the LIVC, then the valve overlap is not generated even if the engine state is under the second control region. Therefore, the controller 30 may advance the IVC timing in order to generate the valve overlap.

In addition, the controller 30 may fix the EVO timing so as to apply the maximum duration to the exhaust valve and control the EVC timing such that the control overlap is maximized. At this time, as shown in FIG. 5B, the EVO timing may be fixed at an angle of approximately 40-50 degrees before the bottom dead center to decrease an exhaust pumping.

When the current engine state does not belong to the second control region at the step S130, the controller 30 determines whether the current engine state belongs to the third control region at step S150.

In the step of S150, if the engine load is more than or equal to the second predetermined load and less than the third predetermined load, the controller 30 determines that the engine state is under the third control region. At this time, the controller 30 advances the IVC timing and EVC at step S160.

The IVC timing is controlled at the LIVC position (Late Intake Valve Closing; an angle of approximately 100-110 degrees after BDC, referring to the FIGS. 4A-4C) in the first and second control regions. By the way, since the IVC timing is retarded at the LIVC position, the average pressure in the intake manifold (boost pressure) may be increased and the knocking is generated as the engine load is increased. Accordingly, the fuel efficiency may be deteriorated. Therefore, the controller 30 advances the IVC timing to inhibit or prevent effect as described above in the third control region which has relatively higher load.

At this time, the controller 30 may rapidly advance the IVC timing close to BDC when the engine speed is less than the predetermined speed so as to reflect characteristic of the turbo engine, as shown in FIGS. 4A-4C. In addition, if the engine speed is greater or equal to the predetermined speed, the controller 30 may slowly advance the IVC timing at an angle of approximately 30-50 degrees after BDC because the boost pressure is relatively lower. The predetermined speed may be 1500 rpm.

Furthermore, as shown in FIGS. 5A-5C, the difference between the IVO timing and EVC timing is maximized in the second region, the valve overlap becomes the longest. An desired EVC timing value is realized by keeping the EVO timing and advancing the EVC timing close to the TDC in the third control region. Accordingly the fuel efficiency may be more improved.

When the current engine state does not belong to the third control region at the step S150, the controller 30 determines whether the current engine state belongs to the fourth control region at step S170.

If the engine state is under the fourth control region in the S170, the controller 30 fixes the EVO timing and approaches the EVC timing to the top dead center at step S180.

The fourth control region may be a low boost region that the engine load is greater than or equal to the second predetermined load and the engine speed is greater than or equal to the first predetermined speed and less than the second predetermined speed. For example, the first predetermined speed may be approximately 1500 rpm, and the second predetermined speed may be approximately 2500 rpm.

The fuel efficiency of vehicle may be improved by approaching the IVC timing to the bottom dead center and using short duration of intake valve. However, according to the disclosed present disclosure, the duration of intake valve is fixed. Thereby, when the IVC timing approaches to the bottom dead center, then the IVO timing is advanced to before the top dead center and the valve overlap may be increased.

Therefore, the controller 30 controls the EVO timing to be fixed and the EVC timing to approach to the top dead center, thereby the valve overlap between the intake valve and the exhaust valve may be decreased and combust ability may be improved. Also, the controller 30 may controls the IVO timing to be close to the top dead center.

When the current engine state does not belong to the fourth control region at the step S170, the controller 30 determines whether the current engine state belongs to the fifth control region at step S190.

In the S190, if the engine load is greater than or equal to the third predetermined load and the engine speed is greater than or equal to the first predetermined speed, then the controller 30 determines that the engine state is under the fifth control region. At this time, the controller 30 fully opens a throttle valve and controls the EVO timing to be retarded at step S200.

In the turbo engine, if the throttle valve is controlled to be wide open (WOT) when the engine speed is less than the first predetermined speed (e.g., 1500 rpm), intake port pressure becomes higher than exhaust port pressure by boosting. Therefore, an effect of a scavenging phenomenon which emits combustion gas of the exhaust is prominent in the turbo engine compared to a natural aspirated engine.

Accordingly, as shown in FIGS. 4A-4C, the controller 30 may advance the IVO timing at an angle of approximately 20-40 degrees before BDC to generate the scavenging, and control the IVC timing at angle of approximately 0-20 degrees after BDC. However, the duration of the intake valve is fixed according to the present disclosure, thereby, in case that the IVO timing is advanced to before the top dead center, the IVC timing may be set at greater than or equal to an angle of approximately 20 degrees after the bottom dead center. Thus, the engine performance may be deteriorated.

Therefore, the EVO timing and the EVC timing may be controlled so as to make up for the scavenging effect by reducing exhaust interference. Moreover, as shown in FIGS. 5A-5C, the controller 30 may sufficiently retard the EVO timing to after BDC so as to maximally generate the scavenging by reducing interference of exhaust. Furthermore, the EVC timing may be controlled within an angle of approximately 30 degrees after TDC in order to maintain catalyst temperature. Accordingly, short exhaust duration (e.g., 180-210 degrees) may be used in the fifth control region.

When the current engine state does not belong to the fifth control region at the step S190, the controller 30 determines whether the current engine state belongs to the sixth control region at step S210.

In the step of S210, if the engine load is greater than or equal to the third predetermined load and the engine speed is greater than or equal to the second predetermined speed, then the controller determines the engine state is under the sixth control region. At this time, the controller 30 fully opens a throttle valve, advances EVO timing, and approaches the EVC timing to the top dead center at step S220.

When the engine speed is greater than the second predetermined speed (e.g., around 2500 rpm) in the sixth control region, the scavenging phenomenon disappears because exhaust port pressure is much higher than intake port pressure. Therefore, as shown in FIGS. 5A-5C, the controller 30 advances the EVO timing an angle of approximately 30 degrees before BDC and approaches the EVC timing to be close to the TDC to inhibit or prevent an exhaust pumping.

Meanwhile, when WOT control is performed at a high speed condition, knocking is rarely generated in the natural aspirated engine, on the contrary, knocking may be deteriorated in the turbo engine. Thus, the IVC timing should be advanced within an angle of approximately 50 degrees after the bottom dead center to reduce knocking. However, when the IVC timing is advanced, then the IVO timing is also advanced at an angle of approximately 30 degrees before the top dead center. Thereby the valve overlap may be increased. Therefore, the engine performance may be deteriorated.

As described above, according to an exemplary form of the present disclosure, duration and timing of the continuous variable valve are simultaneously controlled, so the engine may be controlled under optimum conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

Moreover, even if the continuous variable valve duration device is skipped, the power performance may be maintained with low cost through a fixed cam in the intake valve.

While the present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for controlling valve timing provided with a continuous variable valve timing (CVVT) device at an intake valve side and a continuous variable valve duration (CVVD) and a continuous variable valve timing (CVVT) devices at an exhaust valve side, the method comprising:
    classifying, by a controller, a plurality of control regions depending on an engine speed and an engine load,
    wherein the plurality of control regions comprises:
        a first control region determined by the controller when the engine load is less than a first predetermined load,
        a second control region determined by the controller when the engine load is greater than or equal to the first predetermined load and less than a second predetermined load,
        a third control region determined by the controller when the engine load is greater than or equal to the second predetermined load and less than a third predetermined load,
        a fourth control region determined by the controller when the engine load is greater than or equal to the second predetermined load and the engine speed is greater than or equal to a first predetermined speed and less than a second predetermined speed,
        a fifth control region determined by the controller when the engine load is greater than or equal to the third predetermined load and the engine speed is less than the first predetermined speed, and
        a sixth control region determined by the controller when the engine load is greater than or equal to the third predetermined load and the engine speed is greater than or equal to the second predetermined speed;
    applying a maximum duration to an intake valve and controlling a valve overlap by using an exhaust valve in the first control region;
    advancing an intake valve closing (IVC) timing and applying the maximum duration to the exhaust valve in the second control region;
    advancing both the intake valve closing (IVC) timing and an exhaust valve closing (EVC) timing in the third control region;
    fixing an exhaust valve opening (EVO) timing and approaching the exhaust valve closing (EVC) timing to a top dead center (TDC) in the fourth control region;
    controlling a wide open throttle valve (WOT) and retarding the exhaust valve opening (EVO) timing in the fifth control region; and
    controlling a wide open throttle valve (WOT), advancing the exhaust valve opening (EVO) timing, and approaching the exhaust valve closing (EVC) timing to the top dead center (TDC) in the sixth control region.

2. The method of claim 1, wherein, when the first control region is determined, the controller controls both the IVC timing and the EVO timing to be fixed and controls the EVC timing to be set up at a maximum value within sustainable combust stability.

3. The method of claim 1, wherein, when the second control region is determined, the controller fixes the EVO timing and controls the EVC timing to be set a value at which a control overlap is maximized so as to apply the maximum duration to the exhaust valve.

4. The method of claim 1, wherein, when the third control region is determined, the controller advances the intake valve closing (IVC) timing to be close to a bottom dead center when the engine speed is less than a predetermined speed, and the controller advances the intake valve closing (IVC) timing to after the bottom dead center when the engine speed is greater than or equal to the predetermined speed.

5. The method of claim 1, wherein, when the fifth control region is determined, the controller advances an intake valve opening (IVO) timing to before a top dead center to generate a scavenging, and the controller controls the exhaust valve closing (EVC) timing to after a top dead center such that a catalyst temperature is maintained within a predetermined temperature.

6. A system for controlling valve timing of a continuous variable valve duration engine provided with a turbo charger, the system comprising:
    a data detector configured to detect data related to a running state of a vehicle;
    a camshaft position sensor configured to detect a position of a camshaft;
    an intake continuous variable valve timing (CVVT) device configured to control an opening timing of an intake valve of the engine;

an exhaust continuous variable valve duration (CVVD) device configured to control an opening time of an exhaust valve of the engine;

an exhaust continuous variable valve timing (CVVT) device configured to control an opening timing and an closing timing of the exhaust valve of the engine; and a controller configured to classify a plurality of control regions depending on an engine speed and an engine load based on signals from the data detector and camshaft position sensor, and configured to control the intake CVVT device, the exhaust CVVD device, and the exhaust CVVT device according to the plurality of the control regions, wherein the plurality of control regions comprises:
- a first control region determined by the controller when the engine load is less than a first predetermined load;
- a second control region determined by the controller when the engine load is greater than or equal to the first predetermined load and less than a second predetermined load;
- a third control region determined by the controller when the engine load is greater than or equal to the second predetermined load and less than a third predetermined load;
- a fourth control region determined by the controller when the engine load is greater than or equal to the second predetermined load and the engine speed is greater than or equal to a first predetermined speed and less than a second predetermined speed;
- a fifth control region determined by the controller when the engine load is greater than or equal to the third predetermined load and the engine speed is less than the first predetermined speed; and
- a sixth control region determined by the controller when the engine load is greater than or equal to the third predetermined load and the engine speed is greater than or equal to the second predetermined speed, and wherein the controller applies a maximum duration to the intake valve and controls a valve overlap by using the exhaust valve in the first control region, and the controller advances an intake valve closing (IVC) timing and applies the maximum duration to the exhaust valve in the second control region, advances the intake valve closing (IVC) timing and an exhaust valve closing (EVC) timing in the third control region, fixes an exhaust valve opening (EVO) timing and approaches the exhaust valve closing (EVC) timing to a top dead center in the fourth control region, controls a wide open throttle valve (WOT) and retards the exhaust valve opening (EVO) timing in the fifth control region, controls a wide open throttle valve (WOT), advances the exhaust valve opening (EVO) timing, and approaches the exhaust valve closing (EVC) timing to the top dead center in the sixth control region.

7. The system of claim 6, wherein the controller controls both the IVC timing and the EVO timing to be fixed and controls the EVC timing to be set up at a maximum value within sustainable combust stability in the first control region.

8. The system of claim 6, wherein the controller fixes the EVO timing and controls the EVC timing to be set a value at which a control overlap is maximized so as to apply the maximum duration to the exhaust valve in the second control region.

9. The system of claim 6, wherein the controller advances the intake valve closing (IVC) timing to be close to a bottom dead center when the engine speed is less than a predetermined speed, and the controller advances the intake valve closing (IVC) timing to after the bottom dead center when the engine speed is greater than or equal to the predetermined speed in the third control region.

10. The system of claim 6, wherein the controller advances an intake valve opening (IVO) timing to before a top dead center to generate a scavenging and controls the exhaust valve closing (EVC) timing to after a top dead center such that a catalyst temperature is maintained within a predetermined temperature in the fifth control region.

* * * * *